United States Patent [19]
Simmons et al.

[11] Patent Number: 5,911,196
[45] Date of Patent: Jun. 15, 1999

[54] MATERIALS AND METHODS FOR APPLYING PEST CONTROL MATERIALS TO ANIMALS

[75] Inventors: William Clayton Simmons, Hawthorne; Michael John Burridge; Sandra Anne Allen, both of Gainesville; Leigh Anne Simmons, Hawthorne, all of Fla.

[73] Assignee: University of Florida, Gainesville, Fla.

[21] Appl. No.: 08/933,550

[22] Filed: Sep. 19, 1997

[51] Int. Cl.[6] .................................................. A01K 13/00
[52] U.S. Cl. ............................................ 119/651; 119/652
[58] Field of Search .................................. 119/651, 652, 119/657, 660, 663

[56] References Cited

U.S. PATENT DOCUMENTS

| | | | |
|---|---|---|---|
| 1,528,402 | 3/1925 | Clements | 119/652 |
| 2,964,011 | 12/1960 | Hall | 119/652 |
| 3,118,427 | 1/1964 | Stanzel . | |
| 3,137,274 | 6/1964 | Palmer . | |
| 3,159,144 | 12/1964 | Duncan et al. . | |
| 3,187,722 | 6/1965 | Gilmore et al. | 119/660 |
| 3,727,586 | 4/1973 | Brewster . | |
| 3,870,023 | 3/1975 | Wilson . | |
| 3,941,096 | 3/1976 | Mann . | |
| 4,023,533 | 5/1977 | Mann . | |
| 4,459,942 | 7/1984 | Cauthron . | |
| 5,027,747 | 7/1991 | Talley . | |
| 5,357,902 | 10/1994 | Norval et al. . | |
| 5,367,983 | 11/1994 | Pound et al. | 119/660 X |

FOREIGN PATENT DOCUMENTS

| | | |
|---|---|---|
| 8800079 | 7/1989 | ARIPO . |

OTHER PUBLICATIONS

Sonenshine, Daniel E., Sandra A. Allan, R. Andrew I. Norval, Michael J. Burridge (1996) "A self-medicating applicator for control of ticks on deer" Medical and Veterinary Entomology 10:149–154.

Duncan, I.M. and N. Monks (1992) "Tick Control on Eland (*Taurotragus oryx*) And Buffalo (*Syncerus caffer*) With Flumethrin 1% Pour–On Through A Duncan Applicator" J. S. Afr. Vet Ass. 63:(1):7–10.

Duncan, I.M. (1992) "Tick Control On Cattle With Flumethrin Pour–On Through A Duncan Applicator" J. S. Afr. Vet Ass. 63(3):125–127.

*Primary Examiner*—Robert P. Swiatek
*Attorney, Agent, or Firm*—Saliwanchik, Lloyd & Saliwanchik

[57] ABSTRACT

A portable self-medicating applicator that can be used for the treatment of animals with a pesticide for the control of pests, e.g., ticks and flies. The applicator device holds a liquid container from which pesticide or other medicament can flow to an absorbent material at the periphery of the device such that animals which come in contact with the device have the liquid transferred to them.

20 Claims, 2 Drawing Sheets

MATERIALS AND METHODS FOR APPLYING PEST CONTROL MATERIALS TO ANIMALS

FIELD OF THE INVENTION

The present invention is generally related to controlling populations of pests, e.g., ticks and haematophagous insects that attack livestock, deer, and other wild animals.

BACKGROUND OF THE INVENTION

Treating livestock and game animals to control ticks, biting flies, and similar haematophagous or noxious arthropods or other parasitic pests is essential to prevent major economic losses. Typically, these parasites pierce the skin of animals, causing damage to the hides, blood loss, and irritation, as well as transmission of deadly infectious diseases. These factors contribute to the enormous economic losses sustained by the livestock industry. Losses in livestock production (cattle, sheep, swine, and poultry) in the U.S. due to arthropod pests have been estimated at more than $3 billion. This figure does not include the cost of pest control or losses to the equine industry (Drummond, R. O., J. E. George, S. E. Kunz [1988] *Control of Arthropod Press of Livestock: a Review of Technology*, CRC Press, Inc., Boca Raton, Fla., 245 pp.). Although precise figures for most countries are lacking, estimates of world-wide economic losses due to ticks and tick-borne diseases alone are in the billions of dollars.

Ticks affect approximately 800 million cattle and a similar number of sheep throughout the world (Sutherst, R. W., R. J. Jones, H. J. Schnitzerling [1982] *Nature*(London) 295:320–322). McCosker (McCosker, P. J. [1979] "Global aspects of the management and control of ticks of veterinary importance," In *Recent Adv. Acarology*, Rodriguez, J. D. (ed.), 2:45–53) estimated the world-wide impact of tick-borne diseases of cattle at approximately $7 billion. In addition to transmission of diseases, ticks cause severe damage due to failure of cattle to achieve expected weight gains and damage to hides to be used for leather. According to Norval (Norval, R. A. I. [1990] *Parasitologia* 32:155–163), weight losses in cattle are estimated at 4.4 grams per *Rhipicephalus appendiculatus* female and 10 grams per *Amblyomma hebraeum* female. Estimates of losses in wildlife are unavailable; however, tick infestations of white-tailed deer (*Odocoileus virginianus*) in some areas are so severe that they have been reported to kill fawns (Drummond et al., supra).

Treatment or prevention of insect and tick infestations on animals, especially animals in the wild, is a formidable task. Thus, it is not surprising that no single, universally accepted method is available for this purpose. Common practices for delivering a pesticide, e.g., an insecticide or an acaricide, to livestock include (1) direct, whole-body treatment, where the animal's body is drenched with pesticide-containing liquids; (2) systemics, where the pesticide is allowed to circulate in the host's blood; and (3) controlled-release systems, which are usually physically attached to the animal and which release pesticide continuously over a period of weeks or months.

There are disadvantageous features to all of these previously described methods. Whole body treatments involve substantial waste. In addition, for dipping or spraying, the animals must be herded and driven to, or through, the treatment area. Such procedures are both labor-intensive and stressful to the livestock. Moreover, due to the high potential for spillage, these operations pose significant environmental hazards for the surrounding area as well as health hazards for workers.

Systemics are generally not acceptable, especially for food animals, because of the toxic residues that can concentrate and remain in animal tissues for extended periods. Controlled-release devices, e.g., ear tags, risk infection or skin irritation when these devices are attached to the animal's body. None of these procedures are suitable for use with wildlife such as deer or other large herbivores.

An alternative to the methods described above is self-medication. In self-medication methods, an animal which is attracted to a device that offers a bait, e.g., food, materials for nest construction, etc., is sprayed or coated with pesticide-containing composition when the animal either contacts the device or in some way triggers the device to release the pesticide. Such methods offer an advantage over the previously described methods by minimizing the amounts of pesticide dispersed to the host and, consequently, into the environment.

One well-known example of a self-medicating device is the Duncan Applicator (ARIPO Patent No. AP/88/00079), which has been used to treat livestock and wild ungulates in Africa. The Duncan Applicator consists of a container placed on top of a tall, threaded rod which is placed in a bin containing feed. The overhead container releases an oily liquid pesticide mixture which slowly flows down the rod. When the animals place their heads in the bin to eat the feed, they touch the rod and receive a small amount of pesticide. The Duncan Applicator, due to its design, has limited utility for treating livestock and most wildlife. A principal disadvantage of the Duncan Applicator device is that the container at the top of the threaded rod is small and is exhausted in a short period of time, usually requiring the device to be recharged every day. Such high incidence of maintenance makes the Duncan Applicator difficult to use in areas which may be inconvenient to reach or inaccessible under inclement weather conditions. Further, daily recharging of the Duncan Applicator incurs a high labor cost, making the cost of using the device unattractive. Substituting a larger capacity container on the Duncan Applicator would not provide a complete remedy to the disadvantage of high maintenance. A larger capacity container would increase the tendency for the Duncan Applicator to tip over. If the device is tipped over, the result is a spill of the pesticide on the ground contaminating the environment. The Duncan Applicator poses an environmental threat since the pesticide is not contained and may easily be spilled if the Applicator is knocked over. Two scientific articles have been published relating to this Applicator (Duncan, I. M. (1992) "Tick control on cattle with flumethrin pour-on through a Duncan applicator" *J.S. Afr. Vet. Assoc.* 63:125–127 and Duncan, I. M., N. Monks (1992) "Tick control on eland (*Taurotragus oryx*) and buffalo (*Syncerus caffer*) with flumethrin 1% pour-on through a Duncan applicator" *J.S. Afr. Vet. Assoc.* 63:7–10).

Other variations of self-medicating devices have also been described. U.S. Pat. No. 3,870,023 describes an insecticide applicator for livestock which utilizes a wind-powered spray device. This clearly is distinguished from the subject invention, which does not use a spraying device to apply insecticide. Nor does the subject invention rely on wind power to dispense insecticide.

Other combination feeder/applicators include the inventions described in U.S. Pat. Nos. 3,137,274, 3,187,772, 3,941,096, 4,023,533, and 4,459,942. Each of these patents discloses a feeder to attract livestock and a means for dispensing insecticide which is operable when contacted by the animal. However, none of these patents describe a device which incorporates the elements of the subject invention.

U.S. Pat. No. 3,118,427 describes a "bunt bag" which dispenses liquid insecticide when the bag is contacted by an animal. The '427 device essentially uses an absorbent material to surround the liquid pesticide storage area. U.S. Pat. No. 3,159,144 uses gravity to transfer insecticide from a cable or chain core, saturated with pesticide, to absorbent discs which surround the core. These devices also have limited container capacity and require frequent maintenance.

The livestock oiler disclosed in U.S. Pat. No. 3,727,586 also dispenses insecticide when the animal contacts the device. The '586 patent employs a container which supplies pesticide by gravity to valves which open to dispense insecticide upon contact or rubbing of the valves by the animal. The apparatuses disclosed in U.S. Pat. No. 5,027,747 pertain to the use of absorbent wicks which contact an animal as it passes through a pathway.

The USDA/ARS has patented an apparatus for topical pesticide treatment of wildlife (U.S. Pat. No. 5,367,983). This device consists of four columns around two feed bins. The pesticide is stored in a container in the center of the unit, adding weight to an already substantially unwieldy contraption which is too heavy to be manually lifted.

U.S. Pat. No. 5,357,902 pertains to the UF self-medicating applicator of Norval, Meltzer, Sonenshine and Burridge. This applicator contains a container for pesticide storage as opposed to the disposable, self-contained column of the subject invention which allows facile, effortless recharging with treatment material. This applicator is the subject of the following scientific article: Sonenshine, D. E., Allan, S. A., Norval, R. A. I. and Burridge, M. J. (1996) "A self-medicating applicator for control of ticks on deer" *Med. Vet. Entomol.* 10:149–154.

It is therefore an object of the subject invention to provide an efficient, low-maintenance self-medicating applicator for wild animals and livestock, e.g., cattle, wild deer, etc. The self-medicating applicator of the subject invention can store an amount of pesticide sufficient to make the applicator maintenance-free for several days, weeks, or months, and dispense a liquid pesticide externally to an animal in such a manner as to treat the animal and thereby deter or kill dangerous, disease-transmitting ticks and other biting insects. As used herein, reference to "pesticide" includes chemical pesticides as well as entomopathic fungi, nematodes, and bacteria, and compounds such as growth regulators.

BRIEF SUMMARY OF THE INVENTION

The subject invention pertains to unique methods and devices useful for applying liquids to animals. More specifically, the subject invention provides devices which can be used to effectively apply pesticides to animals. Advantageously, the devices of the subject invention can be used in remote locations to apply liquids to livestock or wild animals. Preferably, the liquid can be a composition comprising a pesticide or other medicament which is applied to an animal. As used herein, reference to "pesticide" includes chemical pesticides as well as entomopathic fungi, nematodes, and bacteria, and compounds such as growth regulators.

In a preferred embodiment, the device of the subject invention comprises a housing which can hold a liquid container. The housing can be constructed of PVC, treated cardboard, or other sturdy, non-corrosive and non-biodegradable material. The housing is surrounded by an absorbent material through which a liquid can move and be transferred to an animal. Upon placing the liquid container into the housing portion of the subject invention, the liquid container is punctured, or otherwise opened, thereby allowing the liquid to flow from the container. The liquid then travels to the absorbent material where the liquid spreads through the absorbent material and can be transferred to an animal which contacts the material.

Animals can be attracted to the device of the subject invention by a suitable attractant and, while contacting the attractant, they are treated passively by contact with the absorbent material. In one embodiment the device of the subject invention has an animal attractant receptacle which holds, for example, food, materials for nest construction, pheromonal preparations, other attractants, or the like, strategically disposed in relation to the housing so that an animal, while obtaining a bait therefrom, will necessarily contact the absorbent material and thus apply to itself the liquid. As the liquid formulation preferably comprises an active ingredient, or medicament, e.g., pesticide, for treating the animal, the animal thus becomes treated with an appropriate medicament teach time it contacts the absorbent material. In this manner, the animal is treated regularly and, advantageously, without the undesired stress of human handling, or the expense of dipping stations, spraying equipment, and related facilities.

In a specific embodiment, the device of the subject invention consists of a column which has a weather guard attached to the top and an animal attractant at the bottom. In a preferred embodiment, the animal attractant is contained within an animal attractant receptacle. The device can be installed in a vertical fashion to any suitable structure (e.g., buildings, trees, fence posts), or it can be free standing. The weather guard and attractant receptacle can be cone shaped and can act as the attachment points for installation of the invention.

In one embodiment, the housing is a hollow tube, the upper portion of which is adapted to contain the treatment (e.g., pesticide) to be applied to the animal. The treatment can be contained in the upper portion of the column in a container which is activated at the time of installation. At the time of installation, the container can be ruptured by an activation mechanism. In one embodiment, the activation mechanism is contained at the base of the upper portion or within the lower portion of the column. The treatment will then flow to the absorbent material. The column will be saturated both by using the force of gravity to draw the treatment down the lower portion of the absorbent material and by the wicking action of the absorbent material to draw the treatment up the upper portion of the column. The treatment and activation mechanism can be separated by a simple bulkhead inside the housing.

Upon complete utilization of the treatment, the liquid container can be removed and replaced with a new container. The empty container can be recycled or otherwise disposed of in an appropriate manner.

The columns of the subject invention can be specifically constructed to fit onto the column supports of other applicators. In this way, the self-contained treatment columns can replace the original columns, thereby allowing the pesticide containers to be eliminated and consequently reducing possible environmental contamination. After weeks of treatment with the other applicators, only the spent column would need to be disposed of and replaced.

The subject invention further concerns a method for delivering a medicament, e.g., a pesticide, to an animal or treating an animal in need of a medicament, whereby the method employs the novel applicator device as described herein. More specifically, the method comprises placing the novel applicator device in an area accessible to the animal to be treated and supplying the applicator with a bait, e.g., feed, and an appropriate medicament.

This invention is unique and advantageous because it is light-weight and portable, with a self-contained treatment component, and can easily be transported by one person. Also, the subject invention is efficient, low maintenance, environmentally sound and easy to use.

DETAILED DISCLOSURE OF THE INVENTION

Figure 1:
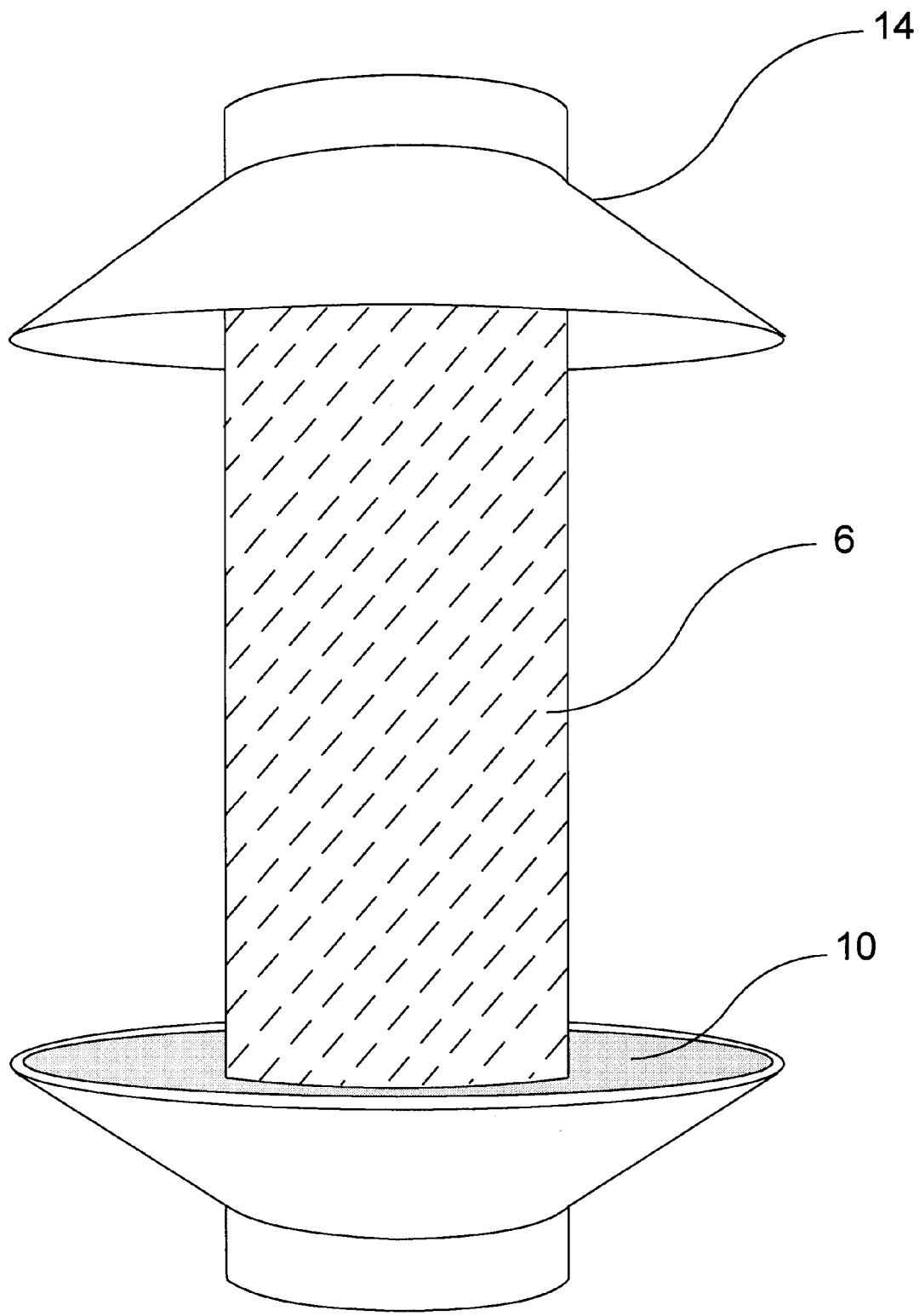
FIG. 1 shows a specific embodiment of the device of the subject invention having a weather guard and an animal attractant receptacle.
Figure 2:
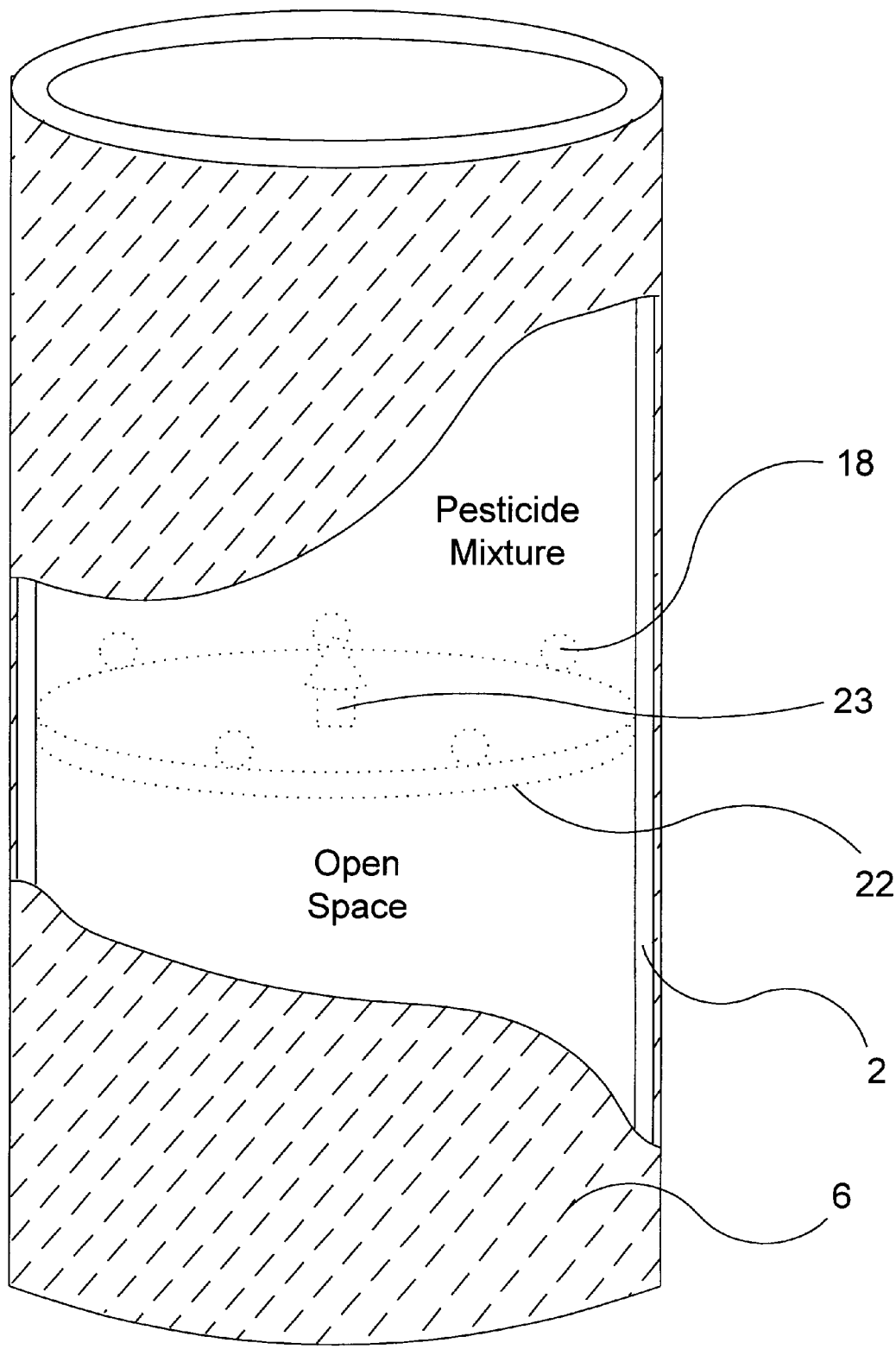
FIG. 2 shows the design of one embodiment of the subject invention having a liquid container compartment at the top portion of the housing having a means for puncturing a liquid container wherein holes in the housing conduct the liquid to the surrounding absorbent material.

The subject invention provides a device for easy, efficient, and effective administration of liquids to animals. Advantageously, this administration can occur passively without the need for human intervention. Specifically, the subject invention provides a system whereby animals contact a surface having a liquid to be applied to the animal. This liquid is readily transferred from the surface to the animal. In a preferred embodiment the liquid contains a pesticide or other medicament. In a specific embodiment, the subject invention concerns a novel device and method for self-medicating an animal susceptible to infestation by pests, including pestiferous ticks and flies which can transmit disease.

As used herein, reference to "pesticide" includes chemical pesticides as well as entomopathic fungi, nematodes, and bacteria, and compounds such as growth regulators.

In a preferred embodiment, the device of the subject invention comprises a housing 2 into which a liquid container can be placed. The liquid container, which contains the pesticide (or other liquid medicament) is sealed and portable. The container is constructed so that, upon placement into the housing, the container is punctured, or otherwise opened, permitting a controlled flow rate of liquid to exit the container. This liquid is conducted to an absorbent material 6 which covers the housing 2. The liquid moves through the absorbent material by gravity, capillary action, absorption, diffusion, or other similar physical process so that the absorbent material is thoroughly wetted with the liquid.

The housing, with its absorbent material and liquid container, is preferably disposed in close proximity to an animal attractant. In a preferred embodiment, an animal attractant receptacle 10 is attached to the base of the housing 2 such that feed, salt, or similar animal attractant placed in the animal attractant receptacle 10 will attract animals to close proximity of the housing 2 and the absorbent material 6. The animal attractant receptacle is preferably substantially open at the top to allow an animal to feed ad libitum.

In use, an animal will visit the device of the subject invention because of the animal attractant. Upon ingesting or otherwise inspecting the animal attractant, the animal will contact the absorbent material thereby having the desired liquid transferred to the animal. Typically, the desired liquid will be an oil based formulation and this oil based liquid will be transferred to the fur of the animal. The liquid will then spread due to normal diffusion, flow, and grooming, and will ultimately cover an effective portion of the animal thereby providing medication and/or protection against pests.

The device of the subject invention can be produced in any of a broad range of sizes depending upon the intended use for the device. Typically these devices will be used in remote locations and therefore, preferably, the devices are of a size to facilitate easy transportation and handling. In a preferred embodiment the devices are large enough to hold a liquid container containing sufficient pesticide or medicament to last for weeks or months. This reduces maintenance and the need for adding new liquid containers to the device.

The device may be any appropriate shape which will allow close contact with an animal attending the animal attractant receptacle. In a preferred embodiment the device will be cylindrical. In the case of a cylindrical housing, the device may be, for example, from about 3 inches in diameter to about 10 inches in diameter. In a preferred embodiment the device will be approximately 4–6 inches in diameter. Typically, the device will be mounted vertically and can stand from about 4 inches in height to 4 feet or more in height. In a preferred embodiment the device is about 2–3 feet in height.

The housing may be made from any material which is sturdy and resistant to the elements. The housing should have sufficient rigidity to effectively enclose a liquid container and to withstand contact with wild animals. Furthermore, the material of the housing should not be susceptible to corrosion or biodegradation. Preferred materials from which the housing may be constructed include PVC and other sturdy, rigid, plastics. Treated cardboard may also be used. These materials are preferable not only due to their non degradability and their rigidity but also because they are lightweight and therefore facilitate ease of transportation of the device.

It will be appreciated by persons of ordinary skill in the art that other embodiments and materials can be used effectively for the housing of the subject device. For example, the housing can be a variety of shapes or sizes, depending on the particular animal being treated or location or placement of the device while in use. Thus, the device can be circular, triangular, rectangular, or of irregular shape.

The inside of the housing is hollow so as to receive the liquid container which contains the pesticide or other medicament to be administered to the animals. The liquid container can be inserted into a portion of the inside of the housing wherein this portion, designated herein as the liquid container compartment, is specifically adapted for receiving and holding the liquid container. In one embodiment, a visual monitoring tube for determining residual liquid in the liquid container can also be provided.

In a preferred embodiment the liquid container compartment will have means for puncturing or otherwise opening the liquid container to facilitate a flow of liquid from the liquid container through the housing and into a surrounding absorbent material. This flow may occur, for example, through holes 18 which have been placed into the housing 2. These holes 18 are of sufficient number and/or size to facilitate the flow of liquid to the absorbent material 6 in quantities which will result in a thorough wetting of the absorbent material 6. In a preferred embodiment the liquid container compartment of the housing is located in the upper portion of the housing such that the flow of liquid into the absorbent material is aided by gravity towards the bottom portion of the device as well as capillary action and diffusion towards the upper portion of the device.

In one embodiment, the platform 22 upon which the liquid container rests within the housing 2 has a means to rupture, puncture, rip, tear, or otherwise open the liquid container. This opening means 23 may be, for example, a sharp or pointed object. Upon opening of the liquid container, the liquid flows out of the container and is conveyed to the absorbent material at the periphery of the device. The conveyance of the liquid to the absorbent material may be by tubes, channels, tunnels or other appropriate liquid conveyance means. The liquid can flow by the force of gravity and/or capillary action, diffusion or other mechanism. In one embodiment, the conveyance means can be adjusted to control the rate of flow so that fluids of varying concentrations and/or viscosities can be used.

The opening of the liquid container within the housing device can be accomplished by simply placing the container into the housing. Alternatively, the device and/or the container can be adapted to require, for example, the application of additional pressure to effect the opening. This additional pressure may result from, for example, pushing on the container and/or screwing the container into place.

Any absorbent material may be used so long as the material is able to be wrapped around, or otherwise attached to the housing and is able to conduct liquid throughout the material and transfer this liquid to an animal which comes in contact with the absorbent material. The absorbed material may be wrapped or otherwise detachably connected to the housing. Alternatively, the absorbent material may be molded into or otherwise integrally formed with the housing. Materials such as New Pig "Pig Mat" can be used. In a preferred embodiment of the subject invention the absorbent material may be removed and replaced as necessary in the event that the material becomes damaged, soiled, or otherwise loses its ability to conduct or transfer the liquid.

In another embodiment of the subject invention, the housing may be made so that multiple housings may be attached end to end thereby stacking the housings to achieve a device of greater height. The device of the subject invention may be attached to a structure or may be free standing. In the free standing embodiment the device may be equipped with a means for attaching the device to the ground or it may be weighted at the bottom of the device to provide stability. In a preferred embodiment, an animal attractant receptacle is provided at the base of the device such that food, salt, water, pheromones, minerals, or other attractant can be provided in order to bring animals into proximity of the device. This animal attractant receptacle may be of any appropriate shape or size but would typically surround the base of the housing such that an animal approaching from any direction would have access to the animal attractant receptacle and, upon inspecting the material in the receptacle, would come into contact with the absorbent material.

In one embodiment the device of the subject invention may also be equipped with a weather guard 14 at the top of the housing 2 so as to reduce exposure to rain and other environmental conditions which could detract from the ability of the device to deliver liquid and/or reduce the longevity of the device. In a preferred embodiment, an absorbent material is used which will not absorb water and, therefore, will not become diluted with water. Exclusion of water from this material enhances the ability to efficiently deliver an oil-based pesticide. An example of such an absorbent material is the "oil-only" Pig Mat.

The device of the subject invention may be used to apply liquid to virtually any animal. In a preferred embodiment the device is used to apply liquids to vertebrate animals, and most preferably the device is used to apply pesticides to wild animals or livestock in remote locations. The device of the subject invention is also highly useful for applying pesticides to domestic or feral livestock that are unmanageable (i.e. too wild or active to restrain for standard application of pesticides).

The applicator device may be used to apply any liquid formulation and would typically be used to apply oil-based pesticide formulations. The pesticides may be for the control of, for example, acarines including ticks. The pesticides may control other pests such as flies. Traditional chemical pesticides may be used as well as herbal remedies and/or biological control agents. The liquid formulation is supplied in a liquid container which will provide the liquid for an extended period of time without the need for maintenance. Periodically the liquid container can be replaced. Upon replacement the liquid container may be replaced with the same pesticide or with a different pesticide. In this manner it is possible to rotate pesticides thereby reducing the likelihood of resistance and/or providing the opportunities to control different pests depending upon the current infestation and the time of the year. In a preferred embodiment the pesticide would last for at least about three months. In order to achieve this length of service in a preferred embodiment the pesticide can be contained in a liquid container of approximately one liter or more.

In using the applicator device, the device can be placed at any location accessible by the animal to be treated and, preferably, is in a location which also facilitates access by a person attending to the maintenance of the applicator device. Animals attracted by a bait, e.g., food, placed in the animal attractant receptacle of the applicator device insert their heads into the receptacle area and, in so doing, contact the column with the top of the head, ears, or neck of the animal. At each contact, pesticide is transferred to the animal's hair and skin and spreads over the surface of the animal's body. A preferred pesticide composition can be an oily substance or mixed with a carrier which is an oily substance, e.g., mineral oil, to facilitate the spreading of the composition over the surface of the animal. With the pesticide coating the surface of the animal, flying insect pests are thus deterred from landing on and biting the treated animal. In addition, pests, e.g., ticks, fleas, flies, etc., which infest the animals are killed by the pesticide. Repeated contact with the device each time the animal attends the attractant receptacle increases the amount of pesticide delivered to each animal. Contact between herd members during grooming, mating, or nurturing of young further disperses the pesticide, thereby reaching additional animals that do not directly contact the subject applicator device. Repeated visits on a daily basis by an animal provide continual pesticidal treatment, in contrast to the periodic treatments that occur when administered by spraying or dipping.

Some of the advantages of this treatment method and device are as follows:

1. It is passive. Animals treat themselves.
2. Food or other materials used to attract animals to the applicator device can easily be supplemented as needed, depending upon the rate of removal by the treated animals.
3. The pesticide container allows use of the device for many weeks or months without recharging, thus saving valuable manpower.
4. Environmental contamination is minimized because the only pesticide used is that which is applied to the target animals. There is no dripping or spraying as occurs with other self-medicating devices, and therefore excess pesticide is not spilled.

5. The device is lightweight and portable.

6. The pesticide container can be easily replaced.

A variety of liquid pesticide compositions can be used. The pesticide can be mixed with mineral oil(s) or any other liquid substance which can act as a carrier and diluent. An important criterion for the diluent is that the resultant formulation containing the pesticide be capable of moving through the absorbent material, and subsequently spreading the liquid formulation containing the pesticide onto the animals. One suitable example is a mixture of mineral oil, in a 3:1 volume ratio with a 1% (v/v) solution of permethrin insecticide in a suitable diluent. The rate of saturation of the material will be primarily controlled by the viscosity of the liquid pesticide composition or mixture. Therefore, it would be within the skill of a person in the art to determine the optimum viscosity of the pesticide composition in order to provide a capillary action rate adequate to rapidly saturate the absorbent material, but slow enough to prevent rapid depletion of the contents of the container. The greater the percentage of mineral oil in the mixture, the slower saturation and depletion of the container will occur.

It should be understood that any pesticide, insecticide, or acaricide, and the like, that can be formulated as a liquid composition and is meant to be applied to the exterior of an animal, is suitable for use in the applicator. Organophosphates, synthetic pyrethroids, amidines, and other groups of acaricides are examples of other suitable chemical pesticides that can be used. Specifically, in addition to permethrin, lambdacyhalothrin, flumethrin, cyfluthrin, deltamethrin amitraz, crotoxyphos, dichlorvos, cyhalothrin, pirimiphos methyl, or malathion and the like are typical pesticides which can be used. Biological agents which can be formulated in a liquid can also be used. Further, the applicator can be used to dispense any topical medicament that can be formulated in a liquid formulation. The applicator is particularly useful for applying any topical medicament that must be applied regularly to the head, ears, or neck of an animal which will be using the device.

The materials used and dimensions for the preferred embodiment are typically as described herein. It should be understood and readily apparent that there exists a wide latitude in the exact dimensions of the subject device, and the physical dimensions and volumetric capacities can be readily altered to suit the need of the task at hand and/or the materials available. It is expected that all the materials used in the preferred embodiment are available and can be obtained from a commercial hardware or supply store or similar establishment.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A device for applying a liquid to an animal wherein said device comprises a housing adapted to receive a container which holds said liquid; wherein said device further comprises an absorbent material through which said liquid can move and, from which, said liquid can be transferred to an animal which contacts said absorbent material; wherein said device further comprises a means for conveying said liquid from said liquid container to said absorbent material; wherein said device further comprises a means for puncturing said liquid container to release the liquid therefrom.

2. The device, according to claim 1, wherein said absorbent material surrounds said housing.

3. The device, according to claim 2, wherein said absorbent material is detachable from said housing.

4. The device, according to claim 1, wherein said housing is constructed of a rigid, non-biodegradable, non-corrosive material.

5. The device, according to claim 4, wherein said housing is constructed of polyvinyl chloride.

6. The device, according to claim 1, wherein said housing is cylindrical and has a diameter between about 2 inches and about 10 inches.

7. The device, according to claim 1, wherein said housing is adapted to be attached end to end with a second housing.

8. The device, according to claim 1, which comprises an animal attractant receptacle.

9. The device, according to claim 8, wherein said animal attractant receptacle surrounds the base of said housing.

10. The device, according to claim 1, wherein said housing comprises holes, channels, or tubes through which liquid from said liquid container can flow to said absorbent material.

11. The device, according to claim 1, wherein said device is adapted to receive said liquid container in the upper portion of said housing.

12. The device, according to claim 11, wherein said housing comprises a platform inside said housing wherein said platform supports said liquid container.

13. The device, according to claim 1, wherein said device comprises a guard disposed at the top of said housing such that said guard protects the device from the environment.

14. The device, according to claim 1, wherein said device comprises means for attaching said device to a structure.

15. The device, according to claim 1, wherein said device is free-standing.

16. A method for applying a liquid to an animal wherein said method comprises providing a device which comprises a housing adapted to receive a container which holds said liquid; wherein said device further comprises an absorbent material through which said liquid can move and, from which, said liquid can be transferred to an animal which contacts said absorbent material; wherein said device further comprises a means for conveying said liquid from said liquid container to said absorbent material; wherein said device further comprises a means for puncturing said liquid container to release the liquid therefrom; and wherein said method further comprises placing said liquid container in said housing such that said liquid flows to said absorbent material.

17. The method, according to claim 16, wherein said device further comprises an animal attractant receptacle having an animal attractant selected from the group consisting of food, salt, minerals, water, and pheromones.

18. The method, according to claim 16, wherein said liquid is a pesticide.

19. The method, according to claim 18, wherein said pesticide comprises permethrin.

20. The method, according to claim 18, wherein said medicament composition further comprises mineral oil.

* * * * *